United States Patent [19]
Fliedner et al.

[11] Patent Number: 5,384,350
[45] Date of Patent: Jan. 24, 1995

[54] BINDERS FOR STORAGE-STABLE COATING COMPOSITIONS

[75] Inventors: Christine Fliedner, Bonn; Friedhelm Schnippering, Siegburg-Braschoss; Karl-Martin Rödder, deceased, late of Troisdorf-Spich, all of Germany, by Krista Rödder, administrator; Reinhard Mattes, Rheinfelden, Germany

[73] Assignee: Hüls Aktiengesellschaft, Marl, Germany

[21] Appl. No.: 102,862

[22] Filed: Aug. 6, 1993

[30] Foreign Application Priority Data

Aug. 11, 1992 [DE] Germany .............................. 4226546

[51] Int. Cl.$^6$ .......................... C08K 5/24; C08L 33/06
[52] U.S. Cl. ..................... 524/261; 524/315; 524/562

[58] Field of Search .................... 106/287.16; 524/315, 524/562, 261

[56] References Cited

U.S. PATENT DOCUMENTS

| | | | |
|---|---|---|---|
| 3,653,930 | 4/1972 | Law et al. | 106/1 |
| 3,948,964 | 4/1976 | Barfurth et al. | 260/448.8 R |
| 4,293,661 | 10/1981 | Probst et al. | 525/380 |
| 4,325,739 | 4/1982 | Biermann et al. | 106/290 |
| 4,522,972 | 6/1985 | Mondt et al. | 524/562 |
| 5,236,493 | 8/1993 | Hunter et al. | 524/562 |

*Primary Examiner*—Melvyn I. Marquis
*Assistant Examiner*—Karen A. Dean
*Attorney, Agent, or Firm*—Felfe & Lynch

[57] ABSTRACT

A binder composition for zinc dust paints contains silicic acid esters, solvents, curing agents, an anti-settling agent and n-butyl acetate. The composition has a flash point above 21° C.

4 Claims, No Drawings

BINDERS FOR STORAGE-STABLE COATING COMPOSITIONS

FIELD OF THE INVENTION

This invention relates to novel binders for storage-stable coating compositions based on a mixture of silicic acid esters, solvents, curing agents and an anti-settling agent, where the mixture has a flash point above 21° C.

BACKGROUND OF THE INVENTION

Binders based on hydrolyzates of silicic acid esters or silicic acid gels for solid particles are well known. Such binders are used in the paint and coating industries. Pigmentation of such binders, for example with zinc dust, results in paints (zinc dust paints) for anti-corrosion coatings on metals, especially on iron and steel. The cured coatings exhibit high surface hardness and thus excellent abrasion resistance, good solvent and heat resistance and electrical conductivity.

The first products in the development of zinc dust paints based on silicic acid gels were two-component systems where, in the simplest case, the first component was a hydrolyzate of ethyl silicate in alcoholic solution as a binder, and the other component was zinc dust. The two components had to be admixed immediately prior to application of the composition, because the coating composition solidified within a few hours after admixture of the zinc dust (U.S. Pat. No. 3,056,684). Subsequent developments utilized the effect of various additives on the processing properties and the quality of the paints, for example by addition of polyvinylbutyral (U.S. Pat. No. 3,392,130), boric acid esters (U.S. Pat. No. 3,392,036), alkyl titanates (U.S. Pat. Nos. 3,442,824 and 3,546,155) or trialkyl phosphates (German Patent 2 000 199). To increase the flash point of the binders, ethyl silicate has been transesterified with higher molecular alcohols (U.S. Pat. No. 3,730,743). Two-component zinc dust paints, however, have some disadvantages with respect to their use. The separate storage of binder and zinc dust causes storage space problems. Once the components are admixed, the mixture must be worked up immediately and completely within a few hours. In addition, ageing of the hydrolyzate during storage changes important technical parameters of use, such as processing properties (for example viscosity) and reactivity (effect on the curing rate), so that considerable problems can arise upon application of zinc dust paints comprising binders of different ages.

Because of these disadvantages, one-component systems were subsequently developed. They were specifically intended to improve the stability of the mixture of binders, pigments and fillers in the drum or pot. Because of the high density of zinc and the low viscosity of the alkyl silicate, the zinc dust settled at the bottom during storage in sealed containers so that it was difficult or impossible to resuspend the precipitate in the supernatant liquid by stirring. The use of specific rheologic additives such as BENTONE ® or pyrogenic silica has made it possible to prepare one-component zinc dust paints which can be used without difficulties even after several months of storage. These formulations contain unhydrolyzed silicic acid esters and only react on contact with atmospheric moisture by hydrolysis and condensation to give up an increasingly crosslinked SiO$_2$ gel (U.S. Pat. No. 3,859,101 and German Patent 26 54 036). The hydrolysis and condensation process is catalyzed with alkaline substances such as amines or alkoxides.

By virtue of the use of alcohols, ketones, ethers and alkyl esters of low molecular carboxylic acids as solvents or solvent mixtures the known binders often have a flash point which is lower than 21° C. Since small amounts of alcohol are liberated by hydrolysis during use of zinc dust paints, it is difficult to achieve a flash point above 21° C. with binders based on ethyl silicate. This is also true if solvents or solvent mixtures are used which originally have a flash point of significantly above 21° C. When xylene is used as the solvent, the flash point of the binders is 23° C. (European Patent 0 039 008). Likewise, the use of propyl or butyl silicates results in systems which have relatively high flash points. In both cases, however, the relatively slow evaporation of the solvent, be it xylene or the liberated alcohol, and the changed hydrolysis behavior of the esterified silicic acid groups delay the initiation of the hardening of the paints.

OBJECTS OF THE INVENTION

It is an object of the present invention to provide binders comprised of a mixture of silicic acid esters, solvents, curing agents and an anti-settling agent, the mixture having a flash point of more than 21° C., which do not exhibit the disadvantages set forth above.

Other objects and advantages of the present invention will become apparent as the description thereof proceeds.

DESCRIPTION OF THE INVENTION

The above object has been achieved in accordance with the present invention by using n-butyl acetate as a solvent component.

The binders of the instant invention have a higher flash point than conventional binders based on silicic acid esters. Moreover, they exhibit good rheologic properties. The rheologically active anti-settling agent is readily soluble in the solvents used in accordance with the present invention. The binder composition according to the present invention forms one component for the preparation of coating compositions. With zinc dust or zinc dust mixtures it forms coating compositions which are known as zinc dust paints. However, other conventional inorganic pigments or fillers such as iron oxide, chromium oxide, titanium oxide, iron mica, barium sulfate, kaolin, talc, mica or mullite, are also compatible with the binder of the instant invention. All of the paints formulated in accordance with the present invention have a longer shelf life in sealed containers.

The pigments or pigment mixtures which may settle out during storage are easy to resuspend by stirring and form a uniform suspension. The pigments do not settle out during the usual storage periods, i.e. between manufacture and use, so that additional stirring before use of the paints is not necessary. The paint compositions formulated in accordance with the present invention can be readily applied in any conventional manner, for example by spraying or brushing, and produce fast-curing (drying) coatings with excellent corrosion protection. The hardness of the coatings on the Erichsen scale is greater than 150 after 2 hours and 20 to 300 after 4 hours. In addition, the paints produced with the aid of the binder compositions of the present invention are compatible with a wide range of top coats based on organic resins.

The silicic acid ester components of the binder composition according to the present invention are monomeric silicic acid esters or oligomeric silicic acid esters of 2 to 10 silicon atoms. The monomeric silicic acid esters correspond to the empirical formula Si(OR')$_4$ wherein R' is alkyl of 2 to 4 carbon atoms. The silicic acid esters are in unhydrolyzed form in the binder composition of the present invention. Preferred silicic acid esters are oligomeric ethyl silicates having an SiO$_2$ content of 18 to 50% by weight, preferably 24 to 40% by weight.

The preferred solvents for the binder composition according to the present invention are esters and aromatic hydrocarbons. n-Butyl acetate is present in all cases. The solvent may be n-butyl acetate exclusively. The content of n-butyl acetate is preferably from 6 to 60% by weight, based on the total weight of the binder composition. The above mentioned solvents are preferably added to the silicic acid ester as a solvent mixture. Particular preference is given to a mixture of n-butyl acetate and aromatic solvents, the latter being commercially available under the name SOLVESSO ® 100, in a weight ratio of 1:5 to 5:1. In accordance with a further preferred embodiment of the present invention, this weight ratio is from 2:1 to 3:1. The solvent content of the binder composition according to the present invention is preferably 40 to 70% by weight, based on the total weight of the binder composition.

Anti-settling agents which have proven to be rheologically effective in the binder composition according to the present invention are styrene copolymers. Most preferred are styrene-acrylate copolymers or polymers based on methacrylates or isobutyl methacrylate. These anti-settling agents exhibit good solubility in the above mentioned solvents and are very highly compatible with the other constituents of the zinc dust paint. The anti-settling agent is added in amounts of about 1 to 20% by weight, preferably from about 8 to 15% by weight, based on the amount of the silicic acid ester which is used.

In order to accelerate the curing reaction, known catalysts can be added to the binder composition according to the present invention. Suitable such curing catalysts are, in particular, alkanolamines such as monoethanolamine, triethanolamine and propanolamines. They are optionally added in amounts of about 0.5 to 25% by weight, based on the amount of silicic acid ester which is used.

The following examples illustrate the present invention and will enable others skilled in the art to understand it more completely. It should be understood, however, that the invention is not limited solely to the particular examples given below.

EXAMPLE 1

A binder composition was prepared by admixing
448 parts by weight of ethyl silicate (commercially available as DYNASIL ® 40),
467 parts by weight of n-butyl acetate,
180 parts by weight of an aromatic solvent mixture (commercially available as SOLVESSO ® 100),
60 parts by weight of styrene acrylate copolymer, and
45 parts by weight of diisopropanolamine.
4800 parts by weight of a paint-grade zinc dust were added to this binder composition. The zinc dust had a mean particle size of 6 to 7 microns and contained added mica, chromium oxide and talc in a total amount of 5% by weight.

The resulting mixture had a shelf life of more than 6 months without any change in properties.

A 60 to 70 microns thick coating of this mixture was bone dry within 6 to 8 minutes at a relative atmospheric humidity of 60% and a temperature of 20° C. It achieved a hardness on the Erichsen scale of more than 150 after 2 hours, a hardness on the Erichsen scale of 300 after 4 hours and a hardness of more than 500 after one day.

The flash point of the finished binder composition was 23° C., measured in accordance with DIN (German Industrial Norms) 53 213.

EXAMPLE 2

A binder composition was prepared by admixing
120 parts by weight of propyl silicate containing about 35 to 40% by weight SiO$_2$,
107 parts by weight of n-butyl acetate,
46 parts by weight of an aromatic solvent mixture (commercially available as SOLVESSO ® 100),
15 parts by weight of styrene acrylate copolymer, and
12 parts by weight of diisopropanolamine.
1200 parts by weight of paint-grade zinc dust of the same quality and composition as that used in Example 1 were added to this binder. The resulting mixture had a shelf life of more than 6 months without any change in properties.

A 60 to 70 microns thick coating of this mixture was bone dry after 10 to 12 minutes at a relative atmospheric humidity of 60% and a temperature of 20° C. It achieved a hardness on the Erichsen scale of 150 after 2 hours, a hardness on the Erichsen scale of 250 after 4 hours and a hardness of 400 to 500 after one day. The flash point of the finished binder composition was 26° C., measured in accordance with DIN 53 213.

EXAMPLE 3

Comparative Example

A binder composition was prepared by admixing
340 parts by weight of ethyl silicate (commercially available as DYNASIL ® 40),
300 parts by weight of ethylene glycol monoethyl ether, 10 parts by weight of polymeric butyl titanate,
230 parts by weight of a 25% solution of a terpolymer of ethyl acrylate, ethyl methacrylate and methyl methacrylate in methyl isobutyl ketone,
45 parts by weight of triethanolamine, and
75 parts by weight of BENTONE ® paste 34 composed of 10 parts by weight BENTONE ®, 10 parts by weight of an electroneutral wetting, suspending and dispersing agent (commercially available as ANTI-TERRA ®-U), and
80 parts by weight of benzine ether 100/140.
4000 parts by weight of paint-grade zinc dust were added to this binder composition. The zinc dust had a mean particle size of 6 to 7 microns and contained added mica, chromium oxide and talc in a total amount of 5% by weight.

The mixture had a shelf life of more than 6 months without any change in properties.

A 60 to 70 microns thick coating of this mixture was bone dry in 10 minutes at a relative atmospheric humidity of 60% and a temperature of 20° C. and achieved a hardness corresponding to a lead pencil H after 90 minutes. The coating had a hardness on the Erichsen scale of 200 after 4 hours and a hardness of 300 after one day.

The flash point of the finished binder composition was 10° C., measured in accordance with DIN 53 213.

While the present invention has been illustrated with the aid of certain specific embodiments, it will be readily apparent to others skilled in the art that the invention is not limited to these particular embodiments, and that various changes and modifications may be made without departing from the spirit of the invention or the scope of the appended claims.

We claim:

1. A binder composition having a flash point above 21° C. for storage-stable coating compositions, said binder composition comprising a mixture of unhydrolyzed silicic acid esters, a curing agent, an anti-settling agent, and a solvent mixture containing n-butyl acetate.

2. A binder composition of claim 1, which contains 6 to 60% by weight of n-butyl acetate based on the total weight of the binder composition.

3. A binder composition of claim 1, wherein the solvent is a mixture of n-butyl acetate and aromatic solvents in a weight ratio of 1:5 to 5:1.

4. A binder composition of claim 1, wherein the solvent content is 40 to 70% by weight of the total weight of the binder composition.

* * * * *